A. B. FRENIER.
GEARING.
APPLICATION FILED DEC. 11, 1908.
1,170,808.
Patented Feb. 8, 1916.
5 SHEETS—SHEET 5.
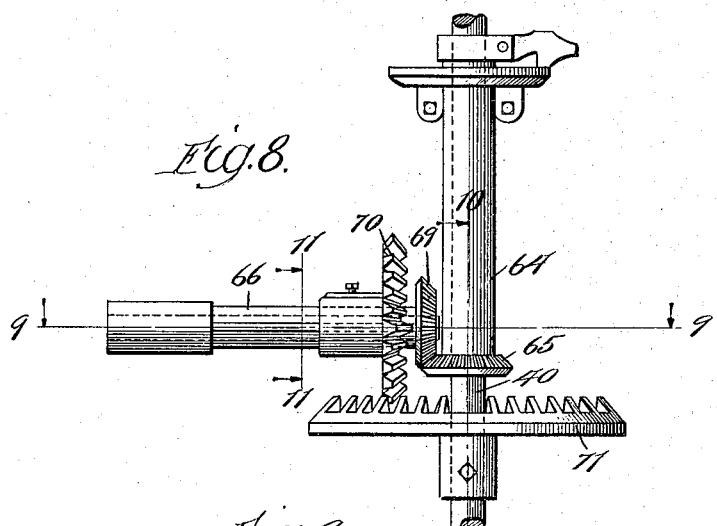
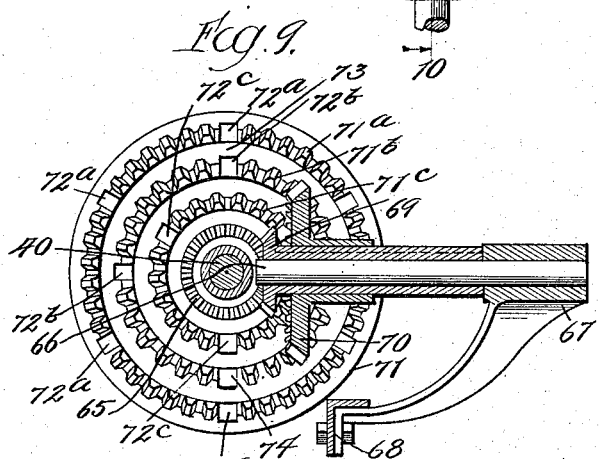
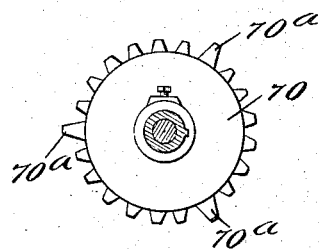
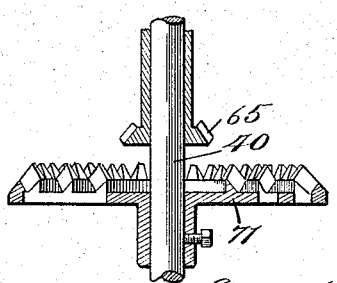
Witnesses:
Inventor:
Albert B Frenier
By Buckley Durand Drury
Attys

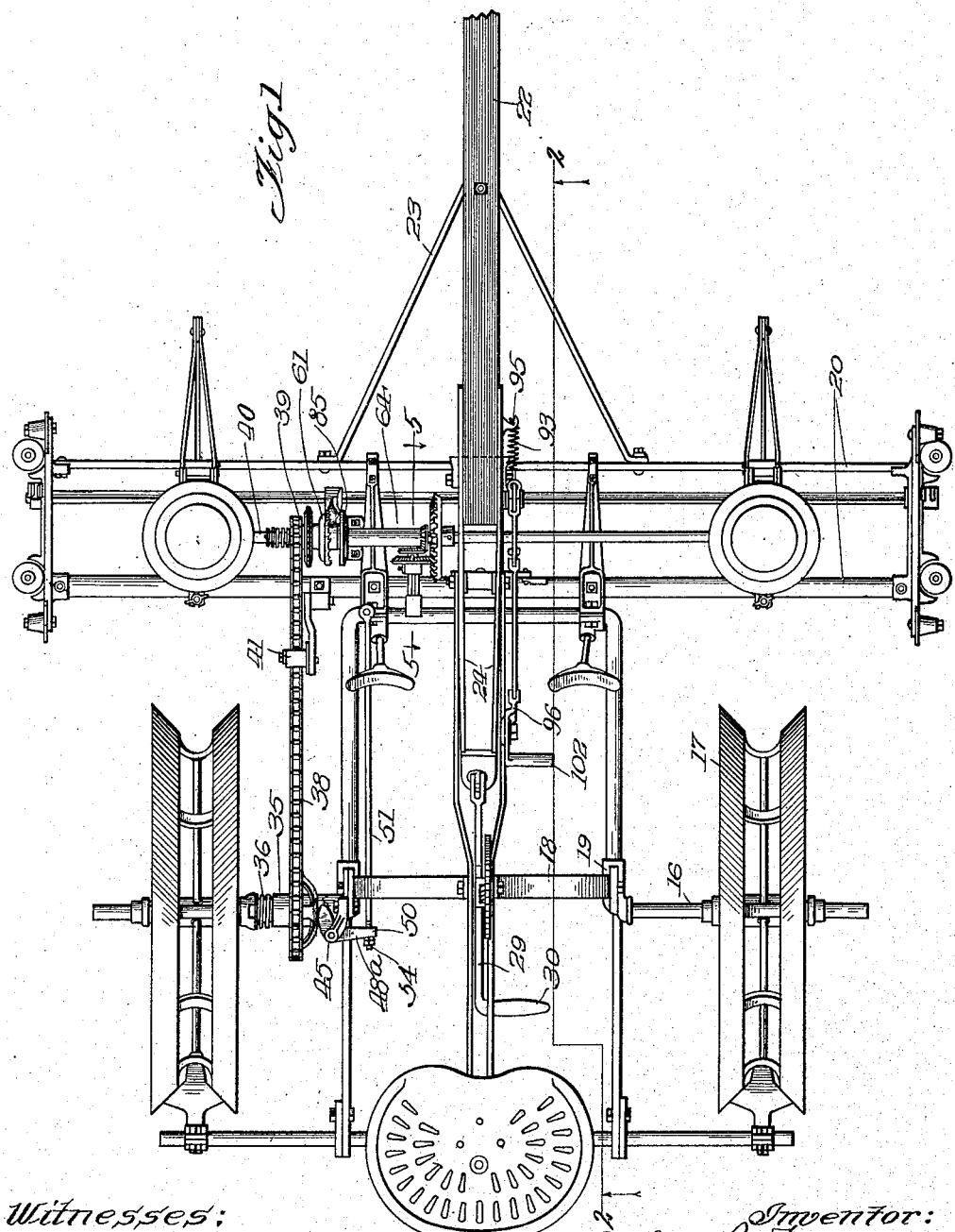

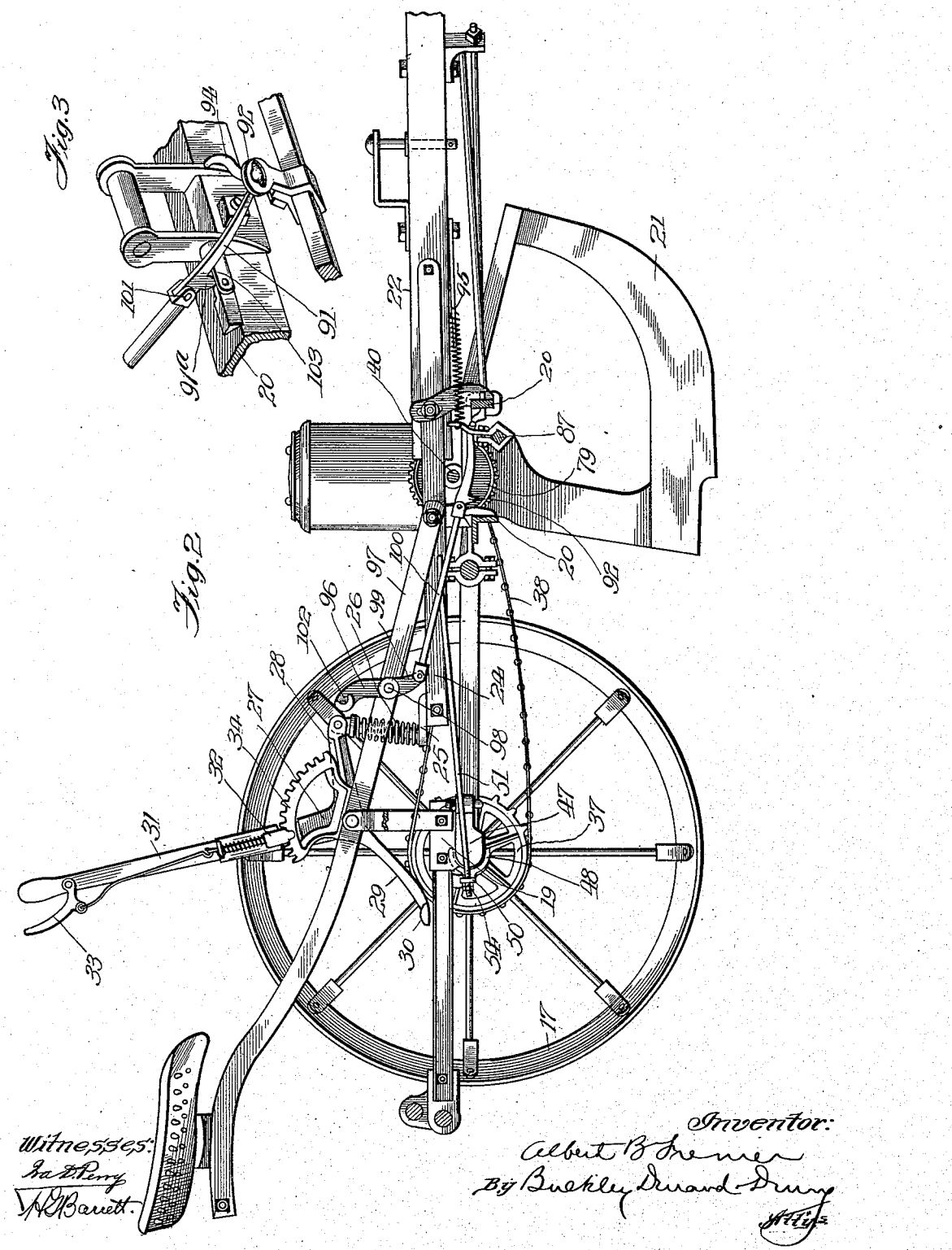

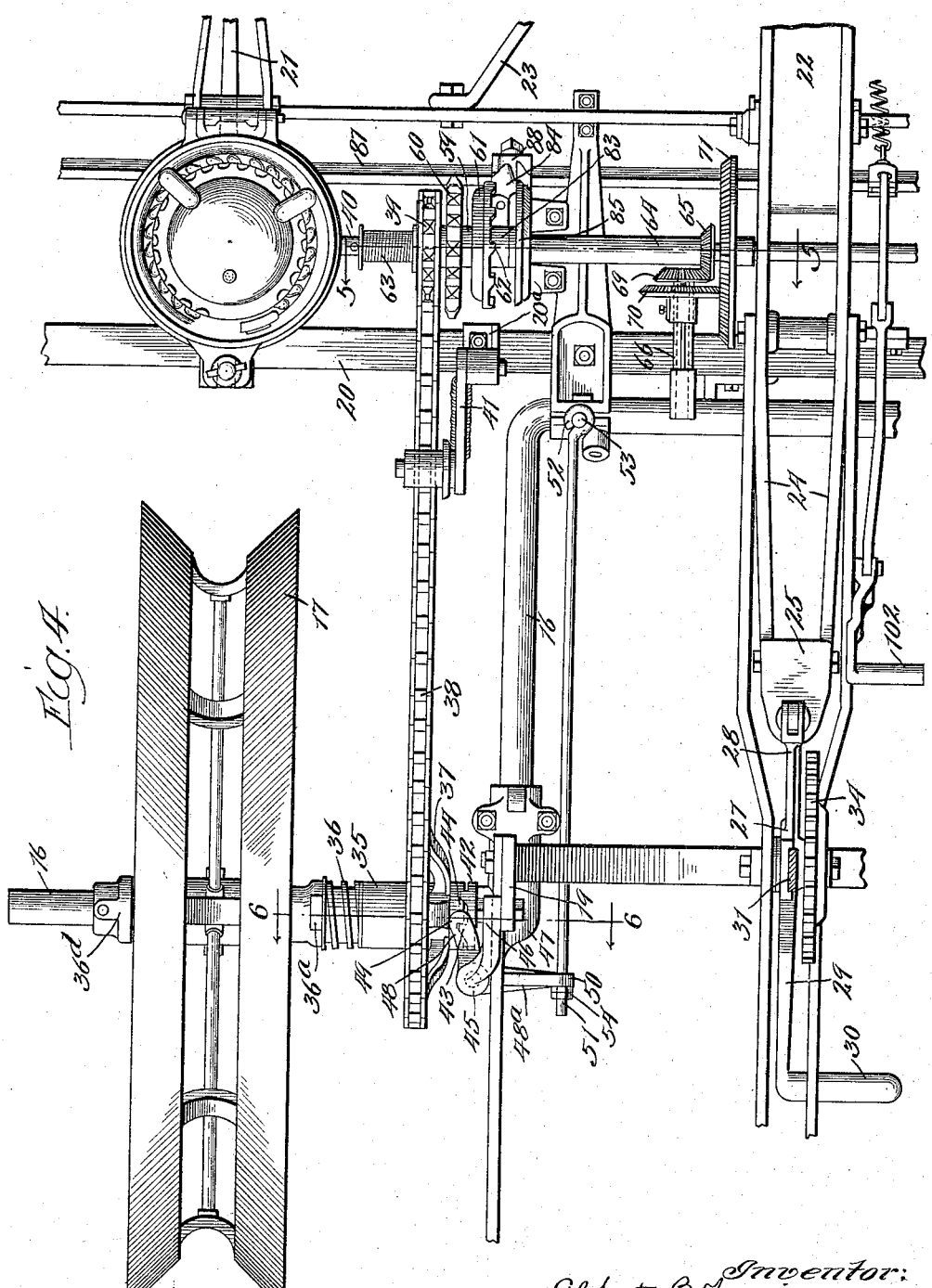

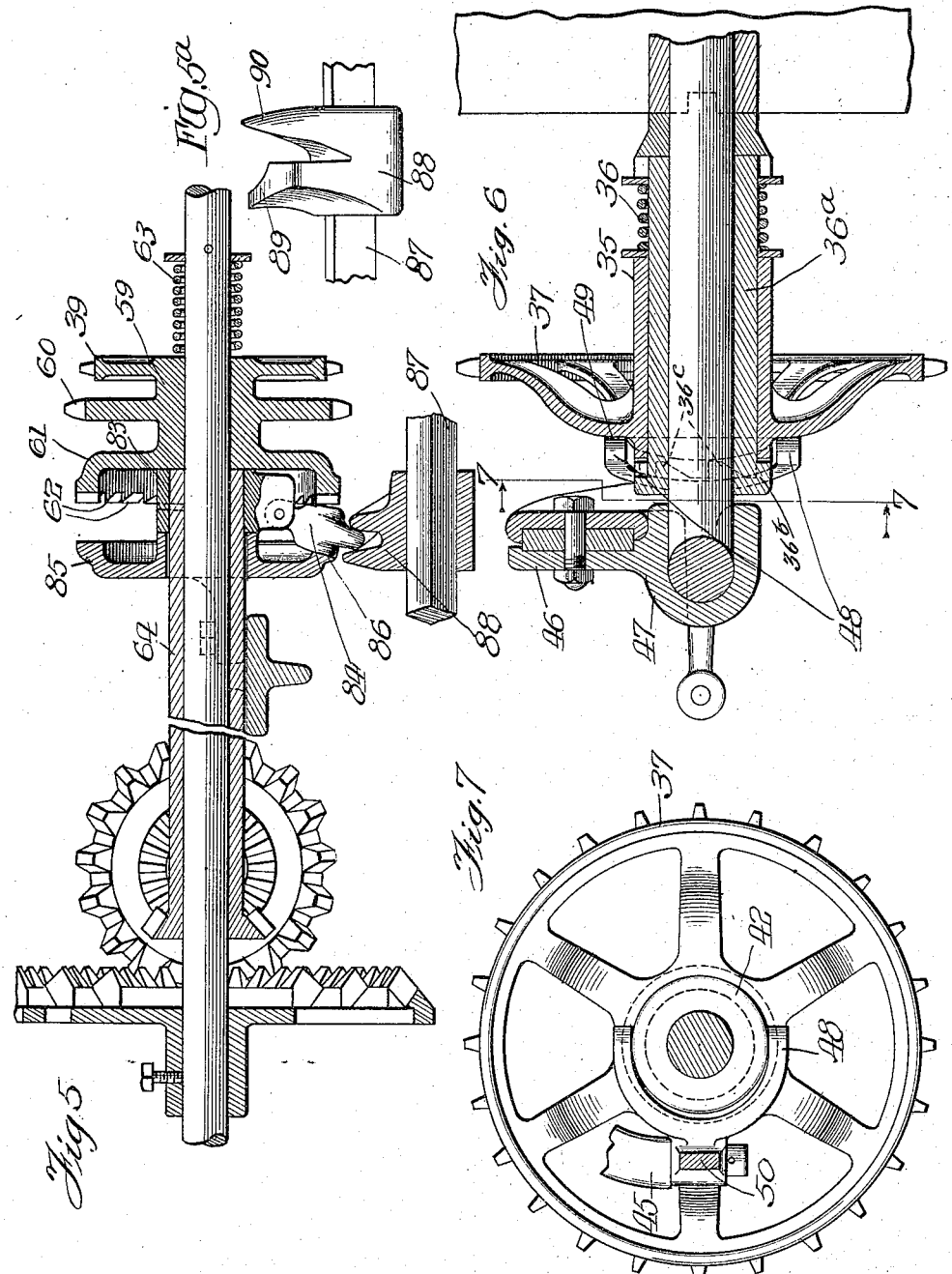

UNITED STATES PATENT OFFICE.

ALBERT B. FRENIER, OF ROCK ISLAND, ILLINOIS, ASSIGNOR TO ROCK ISLAND PLOW COMPANY, OF ROCK ISLAND, ILLINOIS, A CORPORATION OF ILLINOIS.

GEARING.

1,170,808.  Specification of Letters Patent.  Patented Feb. 8, 1916.

Application filed December 11, 1908. Serial No. 467,023.

*To all whom it may concern:*

Be it known that I, ALBERT B. FRENIER, a citizen of the United States of America, and resident of Rock Island, Illinois, have invented a certain new and useful Improvement in Gearing, of which the following is a specification.

My invention relates to improvements in gearing for planters, and has for its object the production of a machine in which, by the use of my improved mechanism, the seed shaft may be caused to revolve a full revolution or any desired part thereof on the rocking of the rock shaft, and in which the mechanism may be locked in drilling position by the use of simple means.

A further object is the utilization of improved mechanism whereby the drive sprocket may be thrown out of engagement on the raising of the planter therefrom, thus stopping the entire mechanism, including the clutch and drive chains.

These and such other objects as may hereinafter appear, are attained by my machine and the mechanisms attached thereto are fully described in the following specification, and embodiments thereof are illustrated in the accompanying drawings in which,—

Figure 1 represents a top plan view of my improved machine. Fig. 2 represents a sectional view on line 2—2 of Fig. 1, looking in the direction indicated by the arrows. Fig. 3 represents an enlarged perspective of the means for changing from a hill drop to a drill drop. Fig. 4 represents an enlarged plan view of a portion of Fig. 1. Fig. 5 represents an enlarged sectional view on line 5—5 of Fig. 4, looking in the direction indicated by the arrows. Fig. 5a represents an enlarged perspective view of my improved cam. Fig. 6 represents an enlarged sectional view on line 6—6 of Fig. 4, looking in the direction indicated by the arrows. Fig. 7 represents an enlarged sectional view on line 7—7 of Fig. 6, looking in the direction indicated by the arrows. Fig. 8 represents an enlarged detail of the variable gear mechanism. Fig. 9 represents a sectional view on line 9—9 of Fig. 8, looking in the direction indicated by the arrows. Fig. 10 represents a sectional view on the line 10—10 of Fig. 8, looking in the direction indicated by the arrows. Fig. 11 represents a sectional view on the line 11—11 of Fig. 8, looking in the direction indicated by the arrows.

Like numerals of reference indicate like parts in the several figures of the drawing.

Referring now to the drawings—16 represents the bail axle on the outer ends of which are mounted the driving and covering wheels 17. A supporting arch 18 is mounted on the bail through the medium of castings 19. A front frame 20 rests on the runners or furrow openers 21, the tongue 22 being also mounted on the front frame and braced by means of brace rods 23. Bars 24 extend rearwardly from the tongue, terminating in a casting or shoulder 25 on which is mounted a spring connection 26. A bell-crank lever 27 is pivotally mounted on the arch 18, one arm of which 28, is pivotally connected to the spring connection 26, the outer arm 29 terminating in a foot-rest 30. A lever 31 is rigidly mounted on the lever or casting 27 and may be controlled by means of a spring and spring dog 32 operated by a latch 33 engaging the teeth of the rack 34 rigidly mounted on the arch. It will thus be seen that by means of the lever 31, assisted by the foot-lift or arm 29, the front frame or runners may be raised or lowered.

Referring now to the transmission of power from the wheel, on one end of the axle 16 inside of the wheel a sleeve or collar 36 is loosely mounted and the end that engages the hub of the ground wheel is notched, and engages cut out portions of the inner end of the hub of the ground wheel, as clearly shown in Fig. 4. The other end of this sleeve 36a is provided with a flange 36b on the inner face of which are clutch teeth 36c, as shown on the dotted lines in Fig. 6. The ground wheel is kept in engagement with this sleeve 36a by a set collar 36d securely attached to the axle 16 on the opposite side of the ground wheel as shown in Fig. 4. A sprocket wheel 37 slips over this sleeve 36a and is provided with a long hub 35. One end of this hub is provided with clutch teeth 44 contacting with the clutch of the sleeve 36a. It can readily be seen that as the sleeve 36a is revolved on the spindle 16 by the turning of the ground wheel, by reason of the fact that the end of the hub of the ground wheel and the end of this sleeve are engaged, it would also turn the sprocket wheel 37 if the two engaged clutch surfaces are in contact, which is the case when the planter front has been lowered to operative position. A chain 38 engages the sprockets of the sprocket wheel 37 and also the sprocket wheel 39 on the operating or seed shaft 40. A tightener or idler 41 is mounted on the frame at 20ᵃ by means of which the tension of the chain may be regulated. A clutch 42 is rigidly mounted on the axle, the teeth 43 of which engage corresponding sockets or the rack 44 on the inner face of the sleeve 36ᵃ or hub of the wheel. A bell-crank lever 45 is mounted on the ear 46 extending upwardly from the bearing sleeve 47. At one end this lever terminates in a yoke 48 encircling the hub of the sprocket wheel 37 and resting against the inner face of the wheel at 49. At the other end the arm 48ᵃ extends at practically right angles to the yoke, and at its end 50 is provided with an opening through which passes a rod 51. This rod at its forward end is preferably provided with an eye 52 secured to the front frame casting at 53. The rear end of the rod is preferably threaded, and by means of the nuts 54 its position in the hole in the bell-crank lever may be so adjusted that the yoke on the lever presses snugly against the face of the sprocket wheel. Of course, other forms of connection may be utilized, but I find that described simple and efficient. It is therefore, apparent that when the lever is operated and the front frame and runner raised from the ground, as, for instance, when turning corners or going to and from the field, the forward end of the rod is also raised, pulling the arm 48ᵃ forwardly and forcing the yoke against the face of the sprocket wheel, thus forcing the sprocket wheel out of the clutch 42 against the compression of the spring 36. When the frame is lowered, the rod and lever resume their normal position and the spring 36 forces the wheel back into engagement with the clutch 42.

Referring now to the operation of the seed shaft and mechanism connected therewith: On the seed shaft 40 is loosely mounted a clutch member 59 comprising in this instance integral sprocket wheels 39 and 60 and a cup-shaped clutch disk 61 provided with a series of teeth 62, a spring 63 normally pressing against the clutch 59. A sleeve 64 also loosely surrounds the shaft 40 on one end of which is cast or rigidly secured a bevel gear 65. A counter shaft 66 is loosely journaled in a bearing 67 bolted to the front frame 20 at 68. A bevel gear 69 is mounted on the end of the countershaft 66, or cast integral therewith, and a shifting pinion 70 is mounted to slide on the countershaft; this pinion is provided with one or more long teeth shown in Fig. 11 as 70ᵃ. On the shaft 40 adjacent to this countershaft 66, is mounted a multiple gear 71 provided with a plurality of circles of teeth shown in Fig. 9 as 71ᵃ, 71ᵇ, and 71ᶜ adapted to mesh with the pinion 70. These circles of teeth on the multiple gear 71 are also provided with a series of depressions 72ᵃ, 72ᵇ, and 72ᶜ adapted to receive the long teeth 70ᵃ on the pinion. On the opposite end of the sleeve 64 is mounted or cast integral therewith a collar 83 on which is pivotally mounted a dog 84, which may be thrown into and out of engagement with the teeth 62 of the clutch 61. A disk 85 is also mounted on the sleeve 64 provided with a slot within which the dog 84 is set when out of engagement with the clutch 61. On the rock shaft 87 is mounted a cam 88 provided with a bearing lug 89 and a shifting finger 90. When the rock shaft is rocked, the bearing lug 89 throws the dog out of the slot and into engagement with the clutch, thus locking the sleeve 64 and clutch member 59, and the sleeve is turned through one revolution. The end of the dog 84 then strikes the shifting finger 90 of the cam, and the dog is thrown out of engagement with the clutch and into the slot 86 until the shaft is again rocked.

When it is desired to drill, the rock shaft is locked in such position that the finger 90 will not throw the dog out of the clutch and the lug 89 will prevent its entering the slot, thus insuring the continuous revolution of the sleeve with the seed shaft. This means for locking the rock shaft is shown in Figs. 3 and 4, and comprises a latch 91 having a hook 91ᵃ at its upper end and connected at its lower end to an upwardly projecting ear 92 on the rock shaft; a spring 93 is secured at one end to the ear or projection therefrom (as at 94) and at the other end to a hook 95 on the tongue. A bell-crank lever 96 is pivotally mounted on the seat bar 97 at 98, to the lower arm of which (99) is secured one end of the rod 100, the other end of which is connected to the latch 91 at 101. A crank arm 102 is extended from the upper arm of the lever 96. It will thus be seen that by pushing forwardly with the foot against the crank or rest 102, the latch is pulled forwardly, the hook 91ᵃ passing over the stop 103 and the rock shaft thus locked for drilling. When it is desired to release the latch, a slight downward pressure of the foot throws the hub off the stop and the spring 93 pulls the rock shaft into hilling position.

It will thus be clearly seen that in my improved machine I accomplish many results in new ways, and by the use of novel and heretofore unknown means. By shifting the pinion 70 on the countershaft, the seed shaft may be given a half revolution to each revolution of the clutch 61, and the seed ring and plates driven at a slow rate of speed, thus greatly assisting in the filling of the seed cell and preventing the accumulation or clogging of corn in front of the cut-off. In addition, it allows more time for the kernels to pass over and away from the cut-off and thus reduces the liability of the kernels to break or crack.

If the pinion 70 were provided with 18 teeth, three of which were long, the inner rank of teeth 72 on the multiple gear also being provided with 18 teeth, there must necessarily have been provided three depressions which I have marked 71ᶜ. One revolution of the gear 70 when meshed with this rank of teeth on the multiple gear 71 would necessarily revolve the shaft to which it is securely attached a full revolution. It was necessary at the starting or on the final assembling of the parts in the construction of the planter to set these two gears at a fixed point relative one to the other, with the seed cells in the seed can in proper position relative to the cut-off and the seed opening in the planter boot. This was determined and this correct position maintained and always thereafter readily ascertained through the medium of this long tooth 70ᵃ in the pinion 70 and the corresponding depression in gear 71. If the proper teeth were once in mesh, the proper combination of cells in the seed ring would be brought into use at each operation of the seeding mechanism so that a given number of kernels would be deposited on the upper valve, building up the hill. You can readily see that if these gears were meshed in a haphazard manner that the proper number of seed cells would not be brought over the opening in the boot, nor would the seed cells come to a state of rest at the end of each operation with the cells in proper position relative to the cut-off. You might at one time pass three full cells over the opening and the half of another. There must, however, be exactly four cells when building up a four kernel hill and this is accomplished by the use of this long tooth and the depressions in the gear. In order to shift the pinion 70 from the inner circle to the outer circle, the planter must be turned by hand until the depression or depressions in the large gear would register as at 73, it being impossible to pass the pinion across the face of the gear 71 except at this point.

Now as the pinion 70 has 18 teeth and the center circle of the teeth on the gear 71 has 24, there must be provided four depressions to receive these long teeth in the pinion 70; these depressions are indicated by 72ᵇ. When the gears are working in this position, the seed shaft is revolved a three-quarter revolution and three kernels are discharged from the seed box onto the valve in the boot, thus building up a hill of three kernels.

When a hill of two kernels is wanted the pinion 70 is shifted to the outer circle of teeth on the gear 71 and as this outer circle has 36 teeth, the shaft will be revolved a one-half revolution, thus passing but two cells of the seed ring over the opening in the boot and building up a hill of two kernels. This shifting can only be accomplished at a point when the three depressions register as shown at 74. Corresponding depressions must be provided as at 72ᵃ.

By the use of my improved mechanism the machine may be changed from a hill drop to a drill drop by a slight forward pressure of the foot and at the same time the parts are securely locked in position. A slight downward pressure of the foot releases the mechanism and rearranges the entire mechanism for hill dropping.

By reason of the introduction of the multiple gear, through the medium of which I actually change the speed of the plate, I can dispense with the furnishing of numerous plates with a different number of cells and accomplish the act of planting at various distances by changing the speed of the plate only. In connection with this multiple gear and variable speed I use but the one set of plates with twenty cells; in other words, I furnish but six plates, these six containing all of twenty cells, divided into two each of different size cells for the large, medium and small corn. Thus instead of being obliged to change the plates for varying the number of kernels in a hill, or vary the distance apart when drilling, I simply shift this shiftable pinion in the countershaft in my variable speed gear. By the use of the countershaft and the multiple gear wheels with different numbers of teeth, it becomes a very simple operation to change the speed of the seed shaft. I have also provided for a positive clutch by means of which the planting mechanism and the seed dropping mechanism may be easily adjusted and regulated. The improved mechanism by which the clutch on the main axle is thrown out of engagement with the main drive is positive in its action, and all of the levers and parts are assembled in compact form in position to be readily operated by the operator.

It is clearly understood that the means illustrated and methods described may be varied, both with respect to the details of operation and construction, and still come within the scope of my invention.

I claim:

1. In apparatus of the class described, the combination of a shaft, a rock shaft, multiple gears supported on said shaft, a clutch for connecting the shaft with and disconnecting it from said gears, a cam mounted on said rock shaft, adapted when the rock shaft is rocked to actuate said clutch, and means whereby said shaft may be caused to pass through a desired part of a revolution with each revolution of said clutch mechanism, said means comprising a countershaft, a pinion mounted thereon and adapted to mesh with said multiple gears, and means for locking any desired gear in operative engagement with said pinion, said pinion provided with an elongated tooth and each of said multiple gears having a corresponding depression.

2. In apparatus of the class described, the combination of a shaft, a rock shaft, multiple gears supported on said shaft, a clutch for connecting the shaft with and disconnecting it from said gears, a cam mounted on said rock shaft, adapted when the rock shaft is rocked to actuate said clutch, and means whereby said shaft may be caused to pass through a desired part of a revolution with each revolution of said clutch mechanism, said means comprising a countershaft a shifting pinion mounted thereon adapted to mesh with said multiple gears whereby said pinion may be shifted on said countershaft to lock said pinion in operative engagement with any of said gears, said pinion provided with an elongated tooth and each of said multiple gears having a corresponding depression.

3. In an apparatus of the class described, the combination with an axle, a shaft, multiple gears mounted on said shaft, a sleeve surrounding said shaft, means for rotating said sleeve from said axle, a pinion mounted on said sleeve and adapted to rotate therewith, a countershaft, a pinion mounted thereon engaging said first-mentioned pinion and a second pinion adapted to mesh with said multiple gears, said last-mentioned pinion having an elongated tooth, and each of said multiple gears having corresponding depressions.

4. In an apparatus of the class described, the combination with an axle, a shaft, multiple gears mounted on said shaft, a pinion driven from said axle meshing with said multiple gears, said pinion being provided with an elongated tooth and there being a corresponding depression in each of said multiple gears, a sleeve surrounding said shaft, means for rotating said sleeve from said axle, a pinion mounted on said sleeve and adapted to rotate therewith, a countershaft, a pinion mounted thereon engaging said first-mentioned pinion and a second pinion adapted to mesh with said multiple gears, said last-mentioned pinion having an elongated tooth, and each of said multiple gears having corresponding depressions.

5. In an apparatus of the class described, the combination with an axle, a shaft, multiple gears mounted on said shaft, a sleeve surrounding said shaft, means for rotating said sleeve from said axle, a pinion mounted on said sleeve and adapted to rotate therewith, and a countershaft, a pinion mounted thereon engaging said first-mentioned pinion and a second pinion adapted to mesh with said multiple gears.

6. In an apparatus of the class described, the combination with an axle, a shaft, multiple gears mounted on said shaft, a pinion driven from said axle meshing with said multiple gears, a sleeve surrounding said shaft, means for rotating said sleeve from said axle, a pinion mounted on said sleeve and adapted to rotate therewith, a countershaft, and a pinion mounted thereon engaging said first-mentioned pinion.

Signed by me at Rock Island, Illinois, this 24 day of Aug., 1908.

ALBERT B. FRENIER.

Witnesses:
H. DETJENS,
J. D. VAN BUREN.

Copies of this patent may be obtained for five cents each, by addressing the "Commissioner of Patents, Washington, D. C."